US 8,787,368 B2

(12) United States Patent
Hughes et al.

(10) Patent No.: US 8,787,368 B2
(45) Date of Patent: Jul. 22, 2014

(54) CROSSBAR SWITCH WITH PRIMARY AND SECONDARY PICKERS

(75) Inventors: William A. Hughes, San Jose, CA (US);
Chenping Yang, Fremont, CA (US);
Michael K. Fertig, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 627 days.

(21) Appl. No.: 12/961,884

(22) Filed: Dec. 7, 2010

(65) Prior Publication Data

US 2012/0140768 A1 Jun. 7, 2012

(51) Int. Cl.
*H04L 12/28* (2006.01)
*H04L 12/56* (2006.01)
*G06F 13/16* (2006.01)

(52) U.S. Cl.
CPC .......... *H04L 49/101* (2013.01); *G06F 13/1657* (2013.01); *H04L 49/10* (2013.01); *H04L 49/1576* (2013.01)
USPC ........... 370/389; 710/110; 710/119; 710/121; 370/416; 370/444; 370/392

(58) Field of Classification Search
None
See application file for complete search history.

(56) References Cited

U.S. PATENT DOCUMENTS

| | | | | |
|---|---|---|---|---|
| 4,989,131 A | * | 1/1991 | Stone | 712/203 |
| 5,495,475 A | * | 2/1996 | Franaszek et al. | 370/389 |
| 5,790,880 A | * | 8/1998 | Ireton | 712/23 |
| 5,805,915 A | * | 9/1998 | Wilkinson et al. | 712/20 |
| 5,852,718 A | * | 12/1998 | Van Loo | 709/208 |
| 6,160,812 A | * | 12/2000 | Bauman et al. | 370/416 |
| 6,161,158 A | * | 12/2000 | Mogaki | 710/119 |
| 6,240,503 B1 | * | 5/2001 | Witt | 712/23 |
| 6,301,653 B1 | * | 10/2001 | Mohamed et al. | 712/214 |
| 6,360,313 B1 | * | 3/2002 | Sachs et al. | 712/215 |
| 6,724,759 B1 | * | 4/2004 | Chang et al. | 370/389 |
| 6,938,133 B2 | * | 8/2005 | Johnson et al. | 711/158 |
| 6,952,419 B1 | * | 10/2005 | Cassiday et al. | 370/392 |
| 7,031,900 B1 | * | 4/2006 | Vakada et al. | 703/17 |
| 7,043,728 B1 | * | 5/2006 | Galpin | 718/102 |
| 7,254,075 B2 | * | 8/2007 | Woo et al. | 365/207 |
| 7,296,167 B1 | * | 11/2007 | Hughes | 713/310 |
| 7,439,763 B1 | * | 10/2008 | Kavipurapu et al. | 326/38 |
| 7,493,426 B2 | * | 2/2009 | Chadha et al. | 710/29 |
| 7,945,884 B1 | * | 5/2011 | Goergen et al. | 716/126 |
| 8,116,316 B1 | * | 2/2012 | Tabatabaee et al. | 370/395.4 |
| 8,370,551 B2 | * | 2/2013 | Ohmacht et al. | 710/110 |
| 2001/0008001 A1 | * | 7/2001 | Suemura | 710/129 |
| 2002/0082714 A1 | * | 6/2002 | Kumamoto et al. | 700/1 |
| 2002/0136230 A1 | * | 9/2002 | Dell et al. | 370/416 |
| 2003/0097499 A1 | * | 5/2003 | Ennis | 710/36 |
| 2003/0145144 A1 | * | 7/2003 | Hofmann et al. | 710/110 |
| 2003/0191923 A1 | * | 10/2003 | Sachs et al. | 712/23 |
| 2003/0217244 A1 | * | 11/2003 | Kelly | 711/168 |
| 2004/0085897 A1 | * | 5/2004 | Jacobi et al. | 370/229 |
| 2005/0013302 A1 | * | 1/2005 | Lee et al. | 370/395.7 |

(Continued)

*Primary Examiner* — Ian N Moore
*Assistant Examiner* — Dung B Huynh
(74) *Attorney, Agent, or Firm* — Volpe and Koenig, P.C.

(57) ABSTRACT

A crossbar switch with primary and secondary pickers is described herein. The crossbar switch includes a crossbar switch command scheduler that schedules commands that are to be routed across the crossbar from multiple source ports to multiple destination ports. The crossbar switch command scheduler uses primary and secondary pickers to schedule two commands per clock cycle. The crossbar switch may also include a dedicated response bus, a general purpose bus and a dedicated command bus. A system request interface may include dedicated command and data packet buffers to work with the primary and secondary pickers.

14 Claims, 3 Drawing Sheets

(56) References Cited

U.S. PATENT DOCUMENTS

| | | | |
|---|---|---|---|
| 2005/0097497 A1* | 5/2005 | Schlansker et al. | 716/14 |
| 2005/0120169 A1* | 6/2005 | Hirako | 711/112 |
| 2005/0135356 A1* | 6/2005 | Muthukrishnan et al. | 370/389 |
| 2006/0190649 A1* | 8/2006 | Ganasan | 710/113 |
| 2006/0236010 A1* | 10/2006 | O'Connor et al. | 710/111 |
| 2007/0198242 A1* | 8/2007 | Brunot | 703/25 |
| 2007/0271402 A1* | 11/2007 | Subramanian et al. | 710/300 |
| 2008/0040724 A1* | 2/2008 | Kang et al. | 718/104 |
| 2008/0043767 A1* | 2/2008 | Ichimiya et al. | 370/412 |
| 2008/0109611 A1* | 5/2008 | Liu et al. | 711/149 |
| 2008/0148009 A1* | 6/2008 | Doerr et al. | 712/11 |
| 2008/0263253 A1* | 10/2008 | Sedeh et al. | 710/308 |
| 2011/0138092 A1* | 6/2011 | Morimoto et al. | 710/244 |
| 2011/0173357 A1* | 7/2011 | Ohmacht et al. | 710/110 |
| 2011/0197031 A1* | 8/2011 | Aho et al. | 711/130 |
| 2011/0225337 A1* | 9/2011 | Byrne et al. | 710/306 |
| 2013/0223165 A1* | 8/2013 | Maheshwari et al. | 365/189.15 |

* cited by examiner

CROSSBAR SWITCH WITH PRIMARY AND SECONDARY PICKERS

FIELD OF INVENTION

This application is related to data processing systems.

BACKGROUND

Multi-core processors run applications more efficiently and allow multi-threaded software to achieve higher performance. These processors may include execution and communications parts. A crossbar switch may be used to communicate between the execution and communications parts.

SUMMARY OF EMBODIMENTS OF THE INVENTION

A crossbar switch with primary and secondary pickers is described herein. The crossbar switch includes a crossbar switch command scheduler that schedules commands that are to be routed across the crossbar from multiple source ports to multiple destination ports. The crossbar switch command scheduler uses primary and secondary pickers to schedule two commands per clock cycle. The crossbar switch may also include a dedicated response bus, a general purpose bus and a dedicated command bus. A system request interface may include dedicated command and data packet buffers to work with the primary and secondary pickers.

DETAILED DESCRIPTION OF THE EMBODIMENTS

Figure 1:
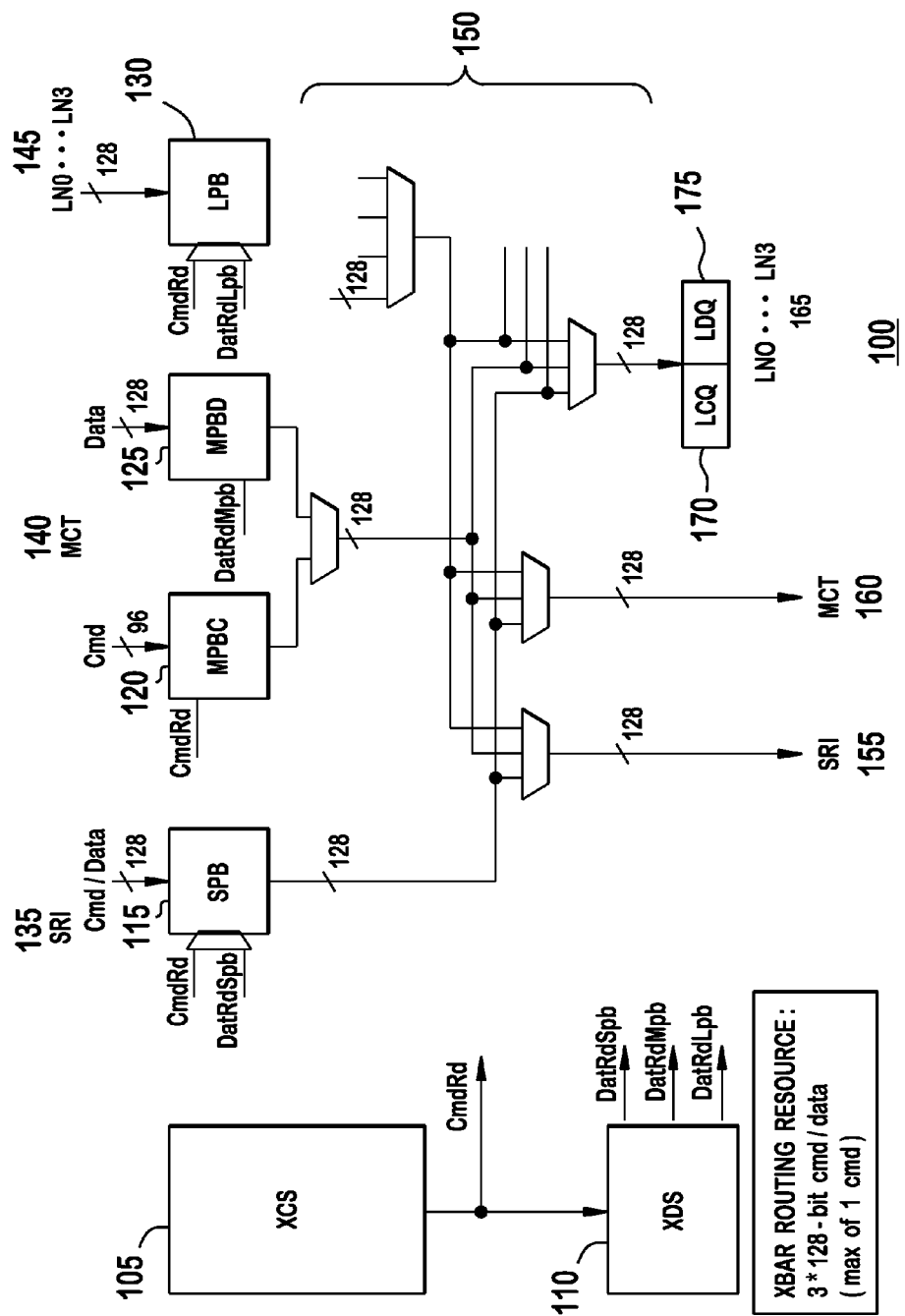
FIG. 1 is a block diagram of a standard crossbar switch.

A standard crossbar switch (XBAR) 100 is shown FIG. 1. The XBAR 100 includes an XBAR command scheduler (XCS) 105 coupled to a XBAR data scheduler (XDS) 110. The term "coupled or connected" as used herein may refer to at least electrical, optical, mechanical or the like connectivity and combinations thereof. The XCS 105 and XDS 110 are also coupled to a system request interface (SRI) packet buffer (SPB) 115, a memory controller (MCT) packet buffer command (MPBC) 120, an MCT packet buffer data (MPBD) 125, and a link packet buffer (LPB) 130. The SPB 115, MPBC 120, MPBD 125 and LPB 130 store commands and data from source ports SRI 135, MCT 140, and links 0 . . . 3 (LN0 . . . LN3) 145 and are connected through a switch matrix 150 to destination ports SRI 155, MCT 160 and LN0 . . . LN3 165. In the later case, the switch matrix 135 feeds a link command queue (LCQ) 170 or a link data queue (LDQ) 175, as appropriate. The switch matrix 135 may include shared 128 bit command/data busses and multiplexers.

The SPB 115 may be a shared command/data packet buffer, the MPBC 120 may be a command packet buffer, the MPBD 125 may be a data packet buffer, and the LPB 130 may be a shared link command/data packet buffer.

The XCS 105 is a single level picker and picks at most one command packet per clock cycle to route on one of the shared 128 bit command/data busses to one of the destination ports. The picker may pick any packet source ports, such as the SRI 135, MCT 140, and links 0 . . . 3 (LN0 . . . LN3) 145, to any of the destination ports such as the SRI 155, MCT 160 and LN0 . . . LN3 165.

The XBAR 100 provides inefficient and insufficient crossbar architecture as it uses three shared, 128 bit command/data bus lines, picks only one command per clock cycle and provides undersized packet buffers and XCS. This leads to insufficient data bandwidth for each source port and imperfect scheduling, which in turn may lead to dead slots on the routing busses.

Described herein is a crossbar switch architecture that increases bandwidth and efficiency by providing a primary and secondary picker, increased packet buffer size and dedicated command and data busses.

Figure 2:
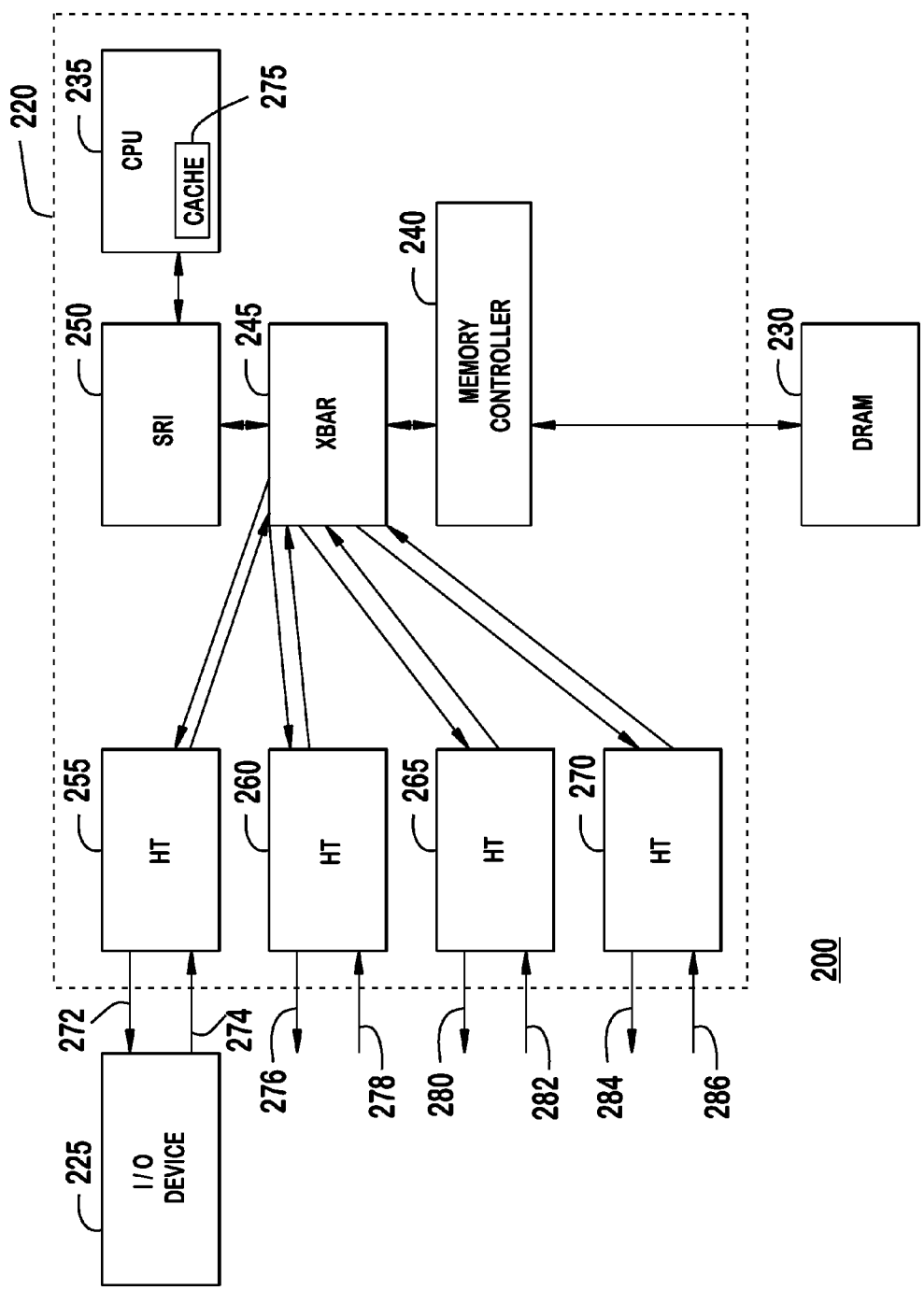
FIG. 2 is an example block diagram of a data processing system.

FIG. 2 illustrates an example block diagram of a computer system 200 that uses an XBAR as described herein below. Computer system 200 may include at least a processor 220, an input/output (I/O) device 225 and a memory 230. Memory 230 may be dynamic random access memory (DRAM), a lower-level memory system including one or more additional caches and main memory, static RAM, nonvolatile memory, and like. Although computer system 200 may show a single processor 220, multiple processors may be used.

Processor 220 may include one or more processor cores 235, an MTC 240, a XBAR 245, an SRI 250 and four host bridges 255, 260, 265 and 270, each a HyperTransport™ technology link (HT). The one or more processor cores 235 can include one or more central processing unit (CPU) cores, graphical processing unit (GPU) cores, one or more digital signal processing cores, and the like. For example, processor core 235 may be an x86 central processing unit (CPU) core that implement x86 64-bit instruction set architecture and are used in desktops, laptops, servers, and superscalar computers, or they may be Advanced RISC (Reduced Instruction Set Computer) Machines (ARM) processors that are used in mobile phones or digital media players. Although the embodiment of FIG. 2 includes one CPU for illustrative purposes, any other number of CPUs will be in-line with the described embodiment. CPU 235 may include a cache 275. In other embodiments, processor 220 may include Digital Signal Processors (DSP) that are particularly useful in the processing and implementation of algorithms related to digital signals, such as voice data and communication signals, and microcontrollers that are useful in consumer applications, such as printers and copy machines. MTC 240 may transfer data between processor 220 and memory 230. MTC 240 offloads the task of initiating and terminating memory accesses from CPU 235.

XBAR 245 is a switching/multiplexing circuit coupling together the buses internal to processor 220 and routes command and data information between the MTC 240, HT links 255, 260, 265, and 270 and the SRI 250. SRI 250 provides an interface for the CPU 235 to the XBAR 245 and manages and prioritizes the CPU 235 access to the XBAR 245, minimizing contention for the system bus. SRI 250 may receive commands from the CPU 235 or the HT links 255, 260, 265, and 270 and process the commands accordingly.

HT links 255, 260, 265 and 270 may be coupled to devices external to processor 220 over output channels 272, 276, 280 and 284, respectively, and over input channels 274, 278, 282, and 286, respectively. Each of the HT links 255, 260, 265 and 270 is a packet-based link and chains of HT links may be used as an I/O channel, connecting I/O devices and host bridges to a host system.

Figure 3:
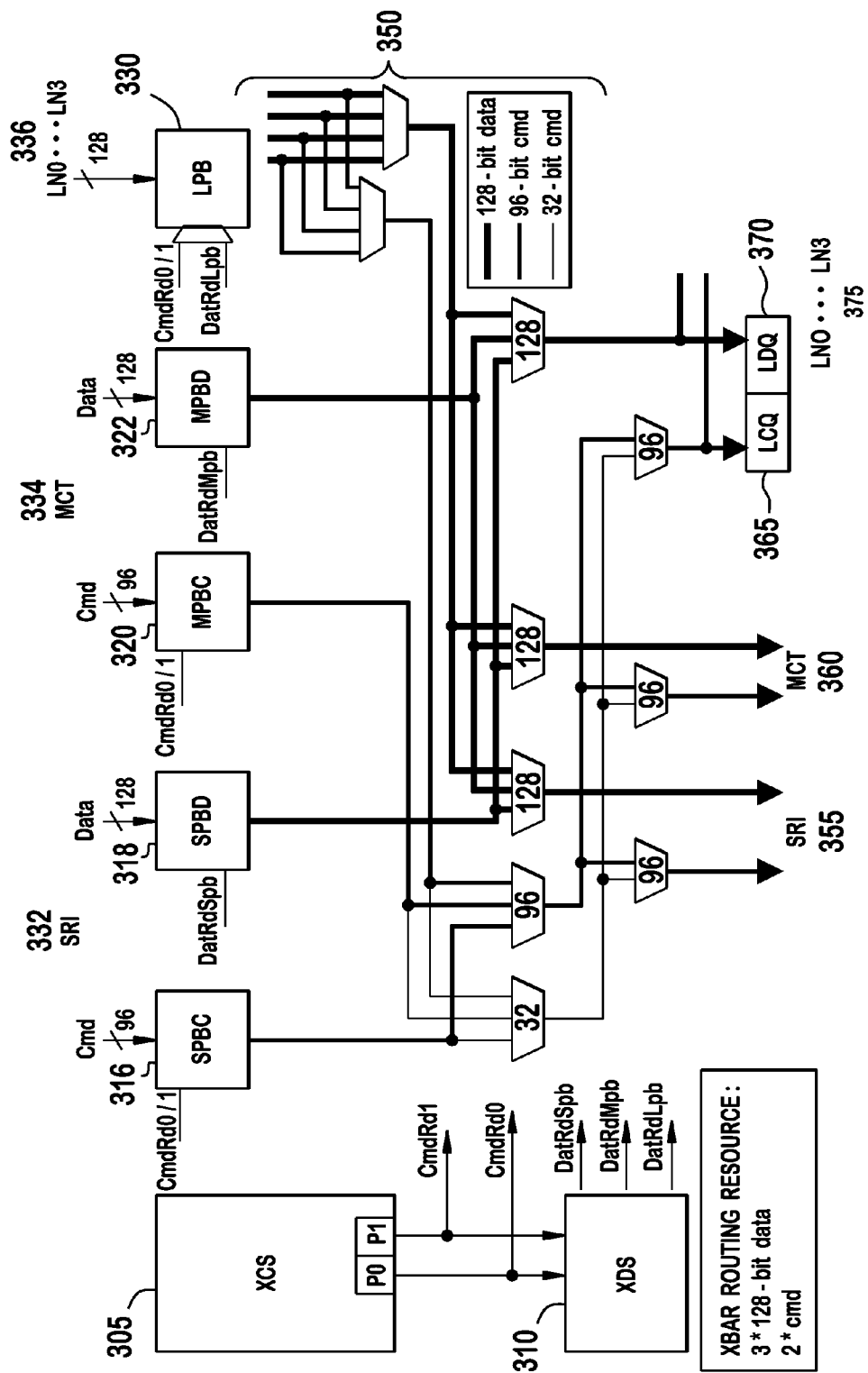
FIG. 3 is an example block diagram of a crossbar switch with primary and secondary pickers.

FIG. 3 shows an example block diagram of an XBAR 300 that may include an XCS 305 coupled to an XDS 310. The XCS 305 and XDS 310 may also coupled to an SRI packet buffer command (SPBC) 316, an SRI packet buffer data (SPBD) 318, an MPBC 320, an MPBD 322, and a link packet buffer (LPB) 330. As described below, the SPBC 316, SPBD 318, MPBC 320, MPBD 322 and LPB 330 may store commands and data, respectively, from source ports SRI 332, MCT 334, and links 0 . . . 3 (LN0 . . . LN3) 336 and may be connected through a switch matrix 350 to destination ports SRI 355, MCT 360 and LN0 . . . LN3 375. In the later case, the switch matrix 350 may feed an LCQ 365 or an LDQ 370, as appropriate.

In an example embodiment, the switch matrix 350 may include a 32 bit command bus, a 96 bit general purpose bus and a 128 bit data bus. The 32 bit command bus may receive response packets from the SPBC 316, MPBC 320 and LPB 330. The general purpose 96 bit command bus may receive command packets from the SPBC 316, MPBC 318 and LPB 330. The 128 bit data bus may receive data from the SPBD 318, MPBD 322 and LPB 330. In one embodiment, some, any or all the above busses may be dedicated, shared, or a combination thereof. The above is illustrative and other combinations of bus sizes, dedicated busses, shared busses and the like may be possible.

The SPBC 316 may be a command packet buffer, the SPBD 318 may be a data packet buffer, the MPBC 320 may be a command packet buffer, the MPBD 322 may be a data packet buffer, and the LPB 330 may be a shared link command/data packet buffer. The SRI 332 and MCT 334 source ports may now provide command and data packets to dedicated packet buffers.

In one embodiment, the XCS 305 may be a 64 entry shifting collapsing structure which provides a central scheduling window for the 64 most recent commands received at the 6 source ports such as the SRI 332, MCT 334, and the LN0 . . . LN3 336. The commands are allocated among the inputs by the SRI TO XCS TOKEN COUNT REGISTER, MCT TO XCS TOKEN COUNT REGISTER, and LINK TO XCS TOKEN COUNT REGISTERS. More recent commands may be held in the source port schedulers (not shown) for the LN0 . . . LN3 336 or back in the system request queue (SRQ) or memory controller queue (MCQ), (neither are shown), until space is available in the XCS 305. Entries in the XCS 305 are shifted towards the "top of stack" position as older entries retire. The XCS 305 favors selection of commands in the order in which they are written to the XCS 305, regardless of the source. However, commands may be completed out-of-order.

Commands and data are written into the appropriate packet buffer associated with the source of the transaction. A scheduling token entry is then made in the XCS 305 indicating the source and destination pointers of the command as well as pointers to the command and data packets in the source port packet buffers. The command scheduler is written two clocks after the command packet is received, (assuming an entry is available in the XCS 305). The XCS 305 picks commands to route based on the availability of resources at the destination. It maintains the order in which commands were received regardless of source, destination and virtual channel. This may avoid starvation problems and maintains channel ordering. The XCS 305 schedules commands to be routed across the XBAR 300 from the six source ports (SRI 332, MCT 334, and LN . . . LN3 336) to the six destination ports (SRI 335, MCT 360 and LN0 . . . LN3 375). Once the XCS 305 picks its commands, the XDS 310 may then pick and schedule the data packets corresponding to the selected command packets.

In an example embodiment, the XCS 305 may include a two-level picker. This allows the XCS 305 to select and route two command packets in one clock cycle. This may increase bandwidth and efficiency. The two pickers are shown in FIG. 3 as pickers P0 and P1 and correspond to the command read 0 and command read 1 lines. The two pickers may work on alternate subsets of inputs on each cycle. For example, in clock cycle N, a first picker may look at the SRI 332, LN0, and LN2 inputs and a second picker may look at the MCT 334, LN1, and LN3 inputs. In clock cycle N+1, the first picker may look at the MCT 334, LN1, and LN3 inputs and the second picker may look at the SRI 332, LN0, and LN2 inputs. In other embodiments, different source ports may be grouped together for each of the pickers. In an example embodiment, the source ports may be grouped according to bandwidth. In another example embodiment, the source ports may be grouped to avoid having the two pickers contend for the same source port. Other combinations are possible and may be implemented using different criteria. Different mechanisms may be implemented to avoid source and destination contentions.

In one embodiment, the first level picker or primary picker may select the input to the dedicated command bus and may choose any available command packet from its currently active subset of sources. This may be represented by picker P0 or the command read 0 line in FIG. 3. The first level picker may have no selection restrictions. In this embodiment, the second level picker may select the input to the dedicated response bus. This may be represented by picker P1 or the command read 1 line in FIG. 3. The second level picker's selections may be restricted and it may, for example, only choose responses, unordered responses destined for the SRI 355 or MCT 360, unordered operation codes, or responses destined for the SRI 355 or MCT 360 destination ports. In another embodiment, the two pickers may have the same selection rights. For example, the primary and secondary may be able to select any command packet and send to any destination port. Other combinations of selection rights may be implemented for the two-level picker.

In one embodiment, if there is a destination collision between the two pickers, and both require the destination port's single entry command buffer, the secondary pick may be cancelled. In this embodiment, the command/data pipelines are not canceled. In another embodiment, skid buffer sizes at the destination ports may be increased from one command packet size to multiple command packet sizes to store the command packets in the event of a destination port collision.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A processor, comprising:
   a crossbar switch configured to connect source ports to destination ports;
   a command scheduler configured to schedule at least two command packets from the source ports to the destination ports during a clock cycle;
   the command scheduler having a first picker configured to select a command packet during the clock cycle; and
   the command scheduler having a second picker different from the first picker, the second picker configured to select another command packet during the clock cycle,
   wherein the second picker is dependent on the first picker for source port selection from the source ports,
   wherein the first picker selects from a first group of source ports and the second picker selects from a second group of source ports during the clock cycle,
   wherein the first picker selects from the second group of source ports and the second picker selects from the first group of source ports in the next clock cycle, and
   wherein the second picker command packet selection is cancelled upon a destination port collision with the first picker command packet selection.

2. The processor of claim 1, wherein the first group of source ports and the second group of source ports contain different source ports.

3. The processor of claim 1, wherein the first picker and the second picker have unrestricted command packet selection rights.

4. The processor of claim 1, wherein the second picker has restricted command packet selection rights.

5. The processor of claim 1, wherein the second picker selects command packets from at least one of response command packets, unordered operations, or predefined destination ports.

6. The processor of claim 1, further comprising:
   a crossbar switch data scheduler responsive to the command scheduler and configured to schedule data packets corresponding to the at least two scheduled command packets.

7. The processor of claim 1, further comprising:
   a system request interface command packet buffer; and
   a system request interface data packet buffer.

8. The processor of claim 1, further comprising:
   a response command packet bus.

9. A computer processing system, comprising:
   a crossbar switch configured to route packets from source ports to destination ports;
   the crossbar switch including a crossbar switch command scheduler (command scheduler) configured to schedule at least two command packets per clock cycle;
   the command scheduler having a primary picker configured to select a command packet during the clock cycle; and
   the command scheduler having a secondary picker different from the primary picker, the secondary picker configured to select another command packet during the clock cycle,
   wherein the second picker is dependent on the first picker for source port selection from the source ports,
   wherein the primary picker selects from a first group of source ports and the secondary picker selects from a second group of source ports in the clock cycle,
   wherein the primary picker selects from the second group of source ports and the secondary picker selects from the first group of source ports in the next clock cycle, and
   wherein the secondary picker command packet selection is cancelled upon a destination port collision with the primary picker command packet selection.

10. The system of claim 9, wherein the secondary picker has restricted command packet selection rights.

11. A method of scheduling packets between source ports and destination ports connected through a crossbar switch of a processor, comprising:
    scheduling at least two command packets to be routed through the crossbar switch from the source ports to the destination ports during a clock cycle;
    picking a first command packet with a first picker to be routed through the crossbar switch during the clock cycle; and
    picking a second command packet with a second picker different from the first picker to be routed through the crossbar switch during the clock cycle,
    wherein the second picker is dependent on the first picker for source port selection from the source ports,
    wherein the first command packet is picked from a first group of source ports and the second command packet is picked from a second group of source ports in the clock cycle,
    wherein the first command packet is picked from the second group of source ports and the second command packet is picked from the first group of source ports in the next clock cycle, and
    wherein the second command packet is cancelled upon a destination port collision with the first command packet.

12. The method of claim 11, wherein the second command packet is selected from a restricted set of command packets.

13. A non-transitory computer-readable storage medium containing a first set of instructions adapted to configure, in part, a processor, wherein the processor is configured to implement a second set of instructions, the second set of instructions comprising:
    a crossbar switch scheduler code segment for scheduling at least two packet commands per clock cycle;
    a first picker code segment for picking a command packet during the clock cycle; and
    a second picker code segment for picking another command packet during the clock cycle, the second picker code segment different from the first picker code segment,
    wherein the second picker is dependent on the first picker for source port selection, wherein the first picker code segment selects from a first group of source ports and the second picker code segment selects from a second group of source ports in the clock cycle, wherein the first picker code segment selects from the second group of source ports and the second picker code segment selects from the first group of source ports in the next clock cycle, and wherein the second picker code segment command packet selection is cancelled upon a destination port collision with the first picker code segment command packet selection.

14. A non-transitory computer readable media including hardware design code stored thereon, and when processed generates other intermediary data to create one or more mask works for a processor configured to perform a method of scheduling packets between source ports and destination ports through a crossbar switch, comprising:

scheduling at least two command packets to be routed through the crossbar switch from the source ports to the destination ports during a clock cycle;

picking a first command packet with a first picker to be routed through the crossbar switch during the clock cycle; and picking a second command packet with a second picker different from the first picker to be routed through the crossbar switch during the clock cycle, wherein the second picker is dependent on the first picker for source port selection from the source ports, wherein the first picker selects from a first group of source ports and the second picker selects from a second group of source ports in the clock cycle, wherein the first picker selects from the second group of source ports and the second picker selects from the first group of source ports in the next clock cycle, and wherein the second picker command packet selection is cancelled upon a destination port collision with the first picker command packet selection.

\* \* \* \* \*